UNITED STATES PATENT OFFICE.

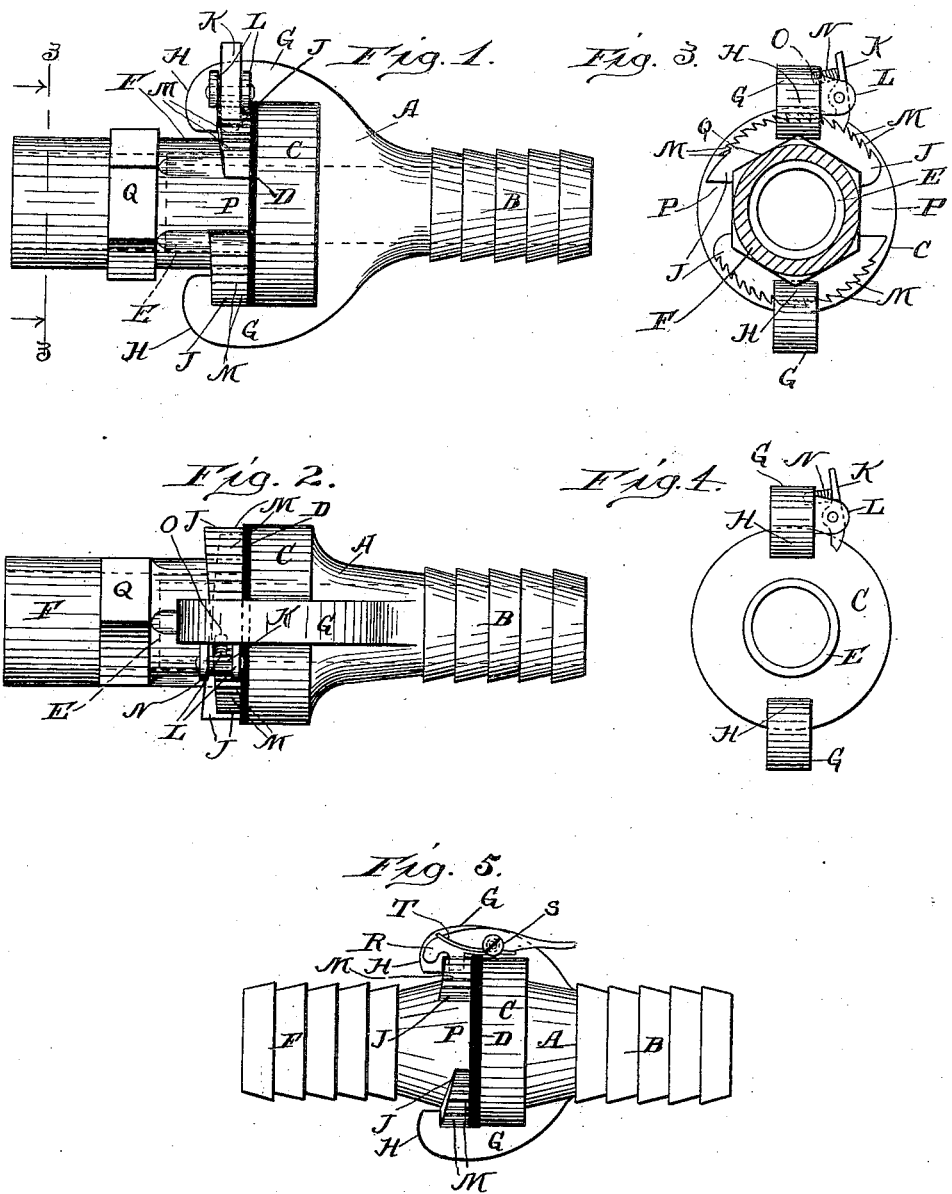

PETER A. WALTHER, OF CHICAGO, ILLINOIS.

HOSE-COUPLING.

No. 917,204.  Specification of Letters Patent.  Patented April 6, 1909.

Application filed May 14, 1906. Serial No. 316,709.

*To all whom it may concern:*

Be it known that I, PETER A. WALTHER, a citizen of the United States, residing at Chicago, in the county of Cook and State of Illinois, have invented certain new and useful Improvements in Hose-Couplings; and I do hereby declare the following to be a full, clear, and exact description of the invention, such as will enable others skilled in the art to which it appertains to make and use the same.

My invention relates to a novel construction in a hose coupling, the object being to provide a simple device of this character which can be readily operated with great ease to form a fluid tight joint and which when coupled cannot accidentally become released and consists in the features of construction and combinations of parts hereinafter fully described and claimed.

In the accompanying drawings illustrating my invention: Figures 1 and 2 are side elevations of a hose coupling constructed in accordance with my invention, and looking at the same from points 90° removed from each other. Fig. 3 is a detail transverse section on the line 3 3 of Fig. 1. Fig. 4 is an end elevation of one of the coupling members. Fig. 5 is a side elevation showing slightly modified form of construction.

My invention has for its particular object to provide a coupling in which the necessity of making a number of turns as is required where the coupling members are disposed in threaded engagement with each other is avoided and the operation of coupling rendered more rapid, simple and efficient, and by reason of the fact that the difficulty of starting threads in engagement with each other is avoided, rendering the coupling operation easy even where there is no light.

My said coupling consists of a member A provided with a hollow shank B having externally annular shoulders as are usually provided on all hose couplings. Said member A is provided with an annularly enlarged head C, the front face of which provides a seat for a flexible washer or gasket D. Concentric with said head C is a projection E having its central opening equal in diameter to the opening in said shank B and it is adapted to enter the annularly enlarged central opening in the mouth portion of the member F. On said member C are two arms G disposed diametrically opposite each other and provided at their free ends with projections H which overhang the front face or seat portion of said head C. The said member F is provided at its free end with two segmental projections J diametrically oppositely disposed and extending through an arc of about 135° each. The said projections J are provided on their peripheries with ratchet teeth M which are adapted to be engaged by a pawl K pivotally mounted between projections L on one of the arms G of the member A and which is normally maintained in engagement with said ratchet teeth M by means of the spiral compression spring N disposed between the outer free end portion of the pawl K and said arm G, the latter being provided with a recess O to receive said spring. The end face of said member F and the end faces of said projections J are disposed flush with each other and form a seat which presses against said washer or gasket D on its other face when said members are coupled. The rear faces of the said segmental projections J are inclined and relatively so disposed that any point in the rear face of one of said projections is diametrically oppositely disposed to the corresponding point in the rear face of the other of said projections. The mean thickness of each of said projections J is substantially equal to the width of the recess formed between each of the projections H of the arms G of said member A and the outer face of the washer or gasket D disposed on the latter. Between the opposite ends of said projections J are recesses P through which said projections H are adapted to pass and coupling said members after said projections have been so passed through said recess P, said members A and F are turned relatively to each other in the direction in which said ratchet teeth M point, whereupon said segmental projections J will enter the recesses between each of said projections H and the outer face of the gasket D and continuing the relative rotation of said members, the inner faces of said projections H will engage inclined faces of said projections J and thus force said members A and F toward each other thereby compressing said gasket D and forming a fluid tight joint between said members. The said shank E of said member A coacts with the enlarged portion of the central opening in said member F to maintain said members centered relatively to each other. While so turning such members to obtain a fluid tight joint the said pawl K will engage each succeeding ratchet tooth in passing to prevent reverse revolution of said members with relation to each other. The outer free end portion of said pawl K serves, however, when pressed against the action of said spring N to release said pawl from engagement with said teeth M thus permitting said members to be reversed to uncouple the same.

Hose couplings are employed largely where high pressures are used and hence it is necessary that the pressure exerted on the gasket D shall be relatively sufficient to prevent leakage. To enable sufficient purchase to be obtained on said members A and F to force them powerfully toward each other, I provide a polygonal surface Q between the ends of the member F which is adapted to be engaged by a wrench the arms G of the member A serving likewise to enable the latter to be readily engaged by a wrench or other source of leverage to obtain the necessary degree of force to effect proper coupling of said members.

It will be noted that the pawl K as shown in Figs. 1 to 4 inclusive, is pivotally movable in a plane parallel with the plane of the front face of the member A and this is preferable but in small couplings such as are used, for instance, for garden hose and the like, it would be impracticable to thus mount said pawl K. Hence in small couplings I prefer to employ a sheet metal dog R pivotally secured to one of the arms G by means of a set screw S entering a threaded opening in one of the side faces of said arm. The said pawl R is maintained normally in position to engage the ratchet teeth M by means of a spring T coiled about said set screws S and bearing at its opposite ends upon one of the free ends of said pawl R and upon the said head C of the member A. The said pawl R serves the same purpose as said pawl K and occupies less space.

It is deemed important that the projection E be integral with the member A and that its opening be equal in diameter to the opening in the shank B and that it be arranged to coact with the enlarged portion of the central opening in the adjacent member F whereby when the members are turned the said shank will prevent wabbling of the members and will maintain the members centered relatively to each other, thus facilitating the clamping of the members together.

I claim as my invention—

A hose coupling comprising two opposed members, one of said members having a shank with externally annular shoulders and annularly enlarged head, the front face of which forms a seat for a gasket, said head provided with concentric projection and diametrically oppositely disposed arms having at their free ends projections overhanging the front face of said head, the other member provided at its free end with segmental projections diametrically oppositely disposed and having toothed peripheries, said segmental projections adapted to engage said gasket, a gasket held exteriorly of and between the meeting faces of said enlarged head and the segmental projections, a pawl pivotally mounted on one of said arms, and a spring acting on said pawl to normally keep it in engagement with the teeth of said segmental projections, said segmental projections having oppositely disposed inclined faces, said concentric projection entering an annularly enlarged central opening in the mouth portion of the adjacent member there being recesses formed between opposite ends of the same to receive the projections of the arms, the mean thickness of each of the segmental projections being substantially equal to the width of said recesses.

In testimony whereof I have signed my name in presence of two subscribing witnesses.

PETER A. WALTHER.

Witnesses:
 RUDOLPH W. LOTZ,
 A. FRANCK-PHILIPSON.